United States Patent Office 3,445,923
Patented May 27, 1969

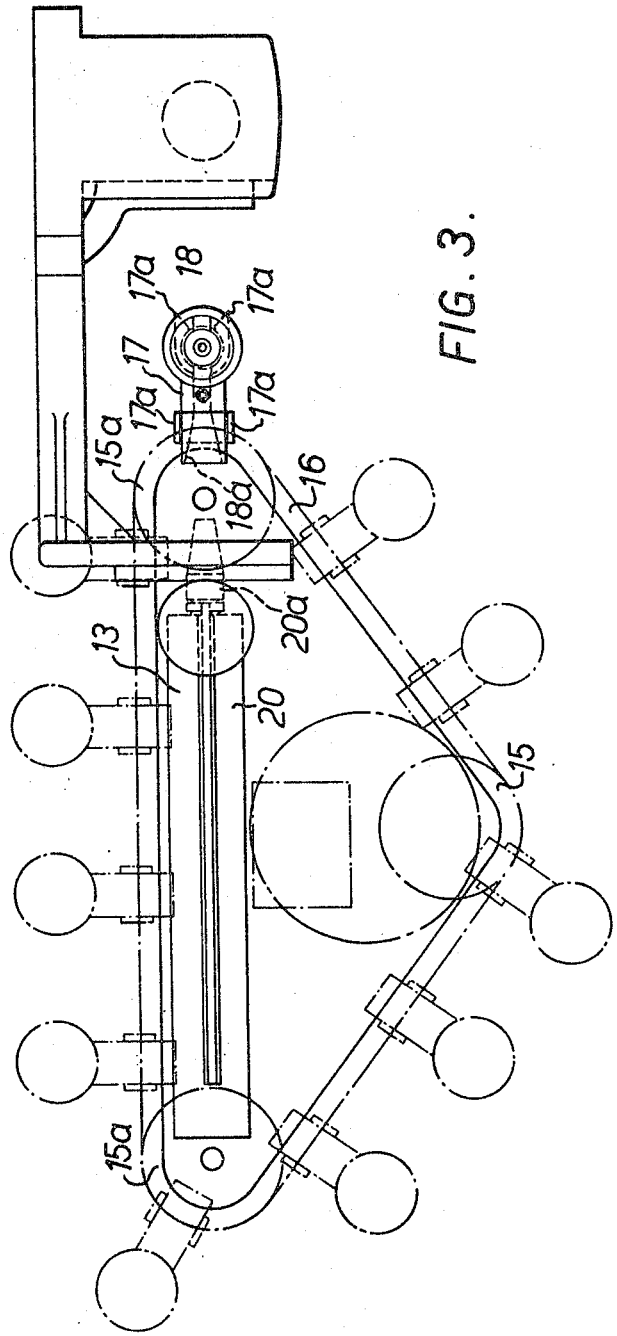

3,445,923
MACHINE TOOLS
Victor Horace Balding, Beavers Wood, Ringland Road,
Taverham, Norwich, Norfolk, England
Filed Jan. 23, 1967, Ser. No. 610,983
Int. Cl. B23q *3/155*
U.S. Cl. 29—568                                 6 Claims

ABSTRACT OF THE DISCLOSURE

The working tools are each mounted in an arbor which are mounted spaced apart around an endless carrier such as a chain with hydraulic means for automatically bringing the tools successively from the carrier into the quill of the machine for a working operation and back to the carrier which then moves to bring the next tool into position.

*Background of the invention*

This invention concerns machine tools, that is, machines having a rotary spindle or the like for carrying a tool such as a drill, reamer or other rotary working tool. The main object of the invention is to arrange for the rapid and correct changing of tools automatically for e.g., carrying out a series of operations by different tools. Another object of the invention is to provide an attachment for carrying a number of tools, which attachment can be fitted easily to standard machines, and which will bring the tools in correct sequence to the spindle and engage same therein and remove them so that a series of operations can be carried out.

A further object is to provide a machine tool which can be programmed e.g., by tape control, to perform a series of successive drilling, boring and like operations on a work piece or pieces, the tools being brought successively into working co-operation with the machine quill and each removed when its working operation is complete and a next tool brought into working co-operation. Yet another object is to provide a construction of machine tool permitting such successive operations in which the angular position of the machine head can be altered.

*Summary of the invention*

According to the invention a normally vertical metal working, i.e. a drilling, reaming or like machine has combined therewith a tool changing mechanism comprising a supporting structure mounted in a normally horizontal plane on and adjacent to the machine head to move therewith and for vertical reciprocal movement with respect to said head, an endless chain mounted to move around said support, a plurality of tool housings detachably mounted in spaced apart relation on said chain, a first motive means mounted on said structure for moving said chain step-by-step fashion, a second motive means mounted between said structure and said head for the vertical reciprocal movement of the structure, and a third motive means for moving a tool housing from its mounting and substantially horizontally to beneath the machine spindle and to return same to its mounting, the second motive means raising the structure when a tool in a housing is beneath the spindle into working engagement therewith, and lowering said structure on completion of the said operation.

It will be understood that the arrangement, as is usual with automatic tool changing mechanisms, is such that tools in arbors supported by the housings are brought successively into the spindle or quill of the machine to carry out working operations.

The third motive means, with the chain stationary, the structure lowered and all housings held on the chain, will first operate to move a holder with its tool, outwardly into axial alignment with the spindle axis. The structure is then moved up by the second motive means to bring the arbor into co-operative engagement with the spindle and the working operation performed. The structure is then lowered by said second means to remove the arbor from the spindle and then the third motive means returns the housing and retracts clear therefrom, when the chain is moved one step by the first motive means to bring the next housing into position ready for engagement by the third motive means and the sequence is repeated.

It will be understood that the operation could be controlled manually, but preferably is programmed automatically such as by tape controlled electronic device or computer. Such programming also can be coupled to automatic operation of the usual machine functions e.g., to effect switch off of the quill drive, axial or other movement thereof and movement of the work piece or pieces so that full automaticity is obtained.

It will be seen that the attachment is of a simple construction and is mounted on a conventional machine with little modification. The head can be arranged to turn in relation to the main machine structure, when the mechanism moves therewith.

The motive means conveniently comprise hydraulic cylinder and ram assemblies. These can be powered from the hydraulics of the machine and also can be controlled easily to effect sequential and correct movement.

*Brief description of the drawings*

The accompanying drawings illustrate by way of example an embodiment of the invention. In the drawings:

FIGURE 3 is a plan view of the construction of FIGURE 2, and

Like references indicate like parts in all of the views.

*Description of preferred embodiments*

Figure 1:
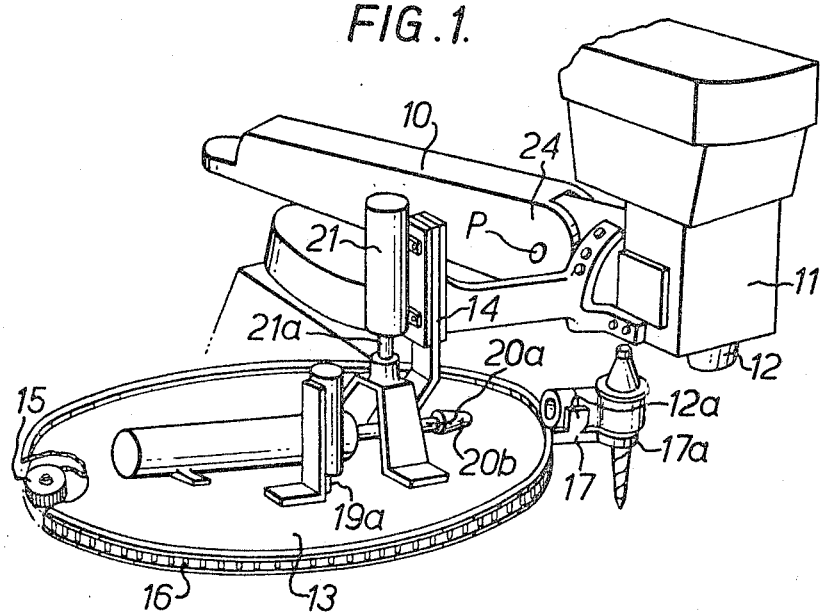
FIGURE 1 is a perspective view to some extent diagrammatic, of one form of the invention.

Referring firstly to FIGURE 1, the machine tool is a normally vertical drilling machine of which only the working head 10, quill housing 11 and nose 12 of its driven tool-housing spindle is shown. The attachment includes a body or support 13 mounted by a slide 14 on the head 10 by a laterally extending and detachable arm. Suitable supporting blocks on the machine with a housing for the hydraulic motor may be provided. The body 13 is elliptical in shape, and supports a drive sprocket 15 and a chain 16 which chain is guided to travel around the body, e.g. by jockey sprockets 15a, see FIGURES 2 and 3. The chain carries holders 17, one of which only is shown in FIGURE 1, these supporting housings 18, in each of which is journalled an arbor of conventional form for holding a tool. The support is by way of channel parts or like parts such as 17a. Three hydraulic cylinders 19, 20, 21, each with a piston or ram 19a, 20a, and 21a are mounted on the body. Movement of the piston 19a moves the chain step by step, the piston 20a an arbor and its housing, either away from or towards the chain and the piston 21a the body vertically up or down with the components carried thereby.

Each housing may be held in its holder by leaf or other spring means against displacement except by the ram 20a.

Figure 4:
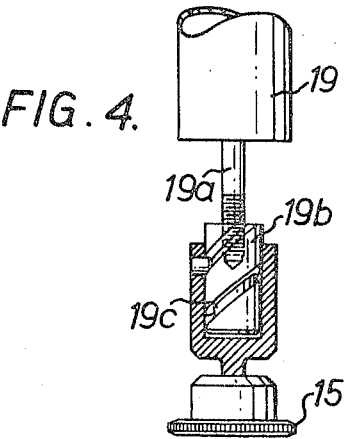
FIGURE 4 is a sectional elevation partly in section of one arrangement for producing step-by-step drive of the endless chain.

The piston 21a is constructed to co-operate with the sprocket wheel 15 to effect indexing of the tools, and moves the said sprocket step-by-step fashion as later described with reference to FIGURE 4.

Figure 2:
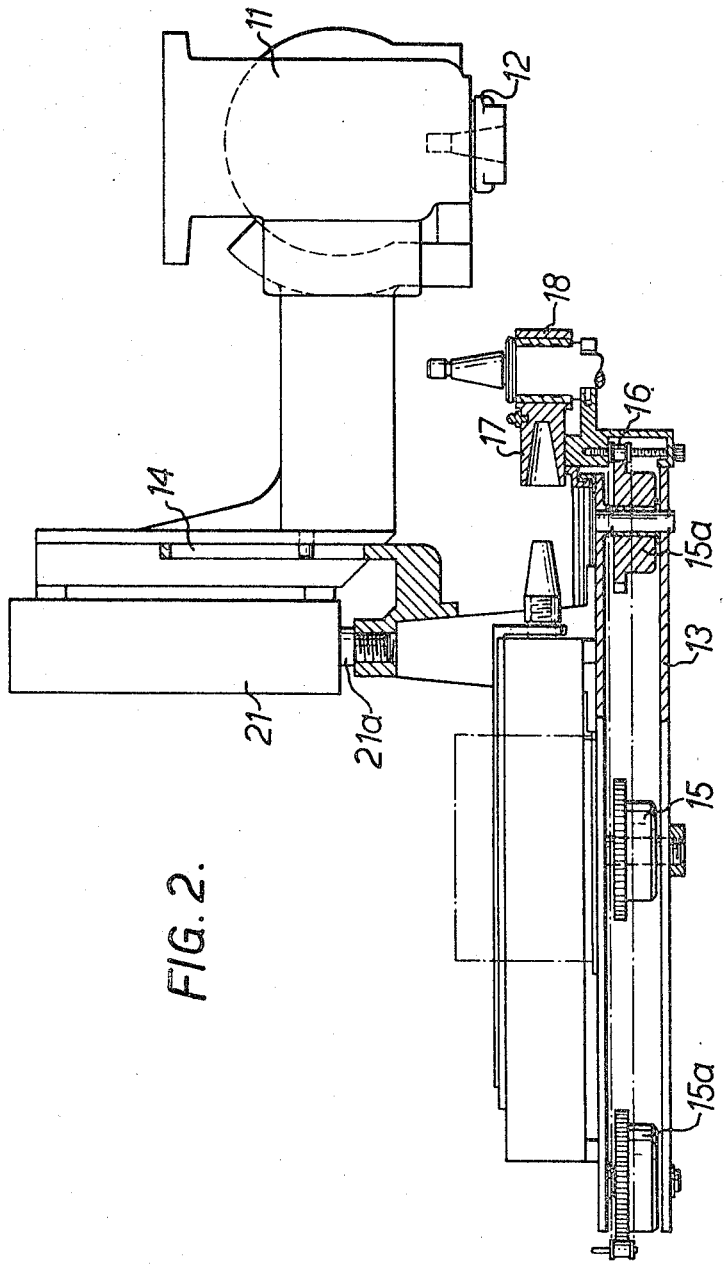
FIGURE 2 is an elevation partly in section of a somewhat modified construction.

In the construction shown in FIGURES 2 and 3, the chain 16 is arranged on a substantially triangular body, one run of the chain being parallel with the axis of the cylinder 20, which axis passes through the axis of a sprocket which is towards the quill of the machine.

The sprocket 15 is the driven sprocket, this being moved by the ram 19a. For clarity the drive to this sprocket is shown separately in FIGURE 4, the cylinder 19 being supported by and above the support 10. The sprocket 19 is carried by a sleeve 15b through a free wheel or other uni-directional drive incorporated in a housing 23 between the sleeve and the sprocket. The plunger 19a carries a cylindrical head 19b with a helical guide slot 19c, the plunger engaging in the head. The sleeve 15b carries a guide pin 22 engaging in this slot.

When the plunger moves axially downwardly, this results in the turning of the sleeve 15b and so the sprocket to move the chain one step. When the plunger returns, the sleeve also turns but owing to the uni-directional drive the sprocket does not return.

It is an important feature of the invention that the attachment is carried by the machine head, which can be mounted so as to turn so that the attachment turns therewith. As will be seen from FIGURE 1 of the drawings the head can turn about a pivot axis 24 so that working operations can be carried out at an angle to the normal vertical. The head and with it the attachment could also instead turn about the axis 23a, FIGURE 2.

In operation, the required tools are set int the arbors, which are then mounted on the chain in correct sequence of operation. An impulse such as from a tape control computer opens an hydraulic valve of an hydraulic circuit, this opening controlling the input to the cylinder 19 and causing the movement of the chain one step by the movement of the ram. This is followed by operation of the piston 21 causing movement of the piston 21a so that the body is lowered. The next operation is the operation of the piston 20a which then moves out so that its tapered nose enters 20b into a complementary hole 18a in the aligning housing 18 and moves this housing, arbor and tool away from the chain body, positioning same so that the arbor is axially aligned with the spindle 12. Then the piston 21a moves the body 10 up so that the arbor enters the spindle nose 12 the pressure holding same for driving engagement. A positive coupling such as a dog clutch could be used for engagement of the arbor in the tool spindle of the machine. The working operation is now performed by the tool the machine being operated by a control, the attachment and head being capable of identical movement after which the body is lowered, the housing returned, the taper lock between the nose of the piston 20a breaking. This completes the cycle of operation.

What I claim is:

1. A normally vertical metal working machine having in combination a tool changing mechanism, said mechanism comprising a supporting structure mounted in a normally horizontal plane on and adjacent to the machine head to move therewith, and for vertical reciprocal movement with respect to said head, an endless chain mounted to move around said support, a plurality of tool housings detachably mounted in spaced relation on said chain, a first, motive means mounted on said structure for moving said chain step-by-step fashion, a second motive means mounted between said structure and said head for the vertical reciprocal movement of the structure, and a third movement means for moving a tool housing from its mounting and substantially horizontally to beneath the machine spindle and to return same to its mounting, the second motive means raising the structure when a tool in a housing is beneath the spindle into working engagement therewith, and lowering said structure on completion of the said operation.

2. A machine as claimed in claim 1, wherein each motive means comprises an hydraulic cylinder and ram assembly, and the said structure is mounted on the machine head by a vertical slideway, the cylinder and ram assembly for vertical movement of said structure being mounted on the upper surface of the structure between said structure and means extending laterally from the machine head carrying said slideway.

3. A machine as claimed in claim 2, wherein the cylinder and ram assembly for moving a tool from and returning same to its mounting is mounted on the structure with its axis parallel thereto, to move a stationary tool holder in axial alignment therewith, and with the structure lowered, out into vertical axial alignment with the machine spindle.

4. A machine as claimed in claim 2, wherein the cylinder and ram assembly for moving the chain is mounted on the structure with its axis vertical and its ram below said structure, said ram driving a sprocket meshing with the chain through a uni-directional drive.

5. A machine as claimed in claim 1, in combination with automated control means for said motive means for the sequential synchronous operation thereof.

6. A normally vertical metal working machine having in combination a tool changing mechanism, said mechanism comprising a supporting structure detachably mounted in a normally horizontal plane on and adjacent to the machine head to move therewith, and to reciprocate vertically with respect to the head, an endless chain mounted around said structure, a plurality of tool housings detachably mounted in spaced relation on said chain, a first hydraulic cylinder and ram assembly mounted on said structure and connected through a uni-directional drive to said chain to move same in step-by-step fashion, a second hydraulic cylinder and ram assembly mounted with its axis vertical between said structure and supporting means for same on the machine head to move said structure reciprocally, a third hydraulic cylinder and ram assembly mounted with its axis horizontal on said structure to engage a tool housing on outward movement of its ram and to move said housing horizontally to beneath the machine spindle and into axial alignment therewith, and synchronously operated control means for the hydraulic circuit to power said assemblies whereby the tools carried by the holders are brought successively into engagement in the spindle for working operations.

References Cited

UNITED STATES PATENTS

| | | | |
|---|---|---|---|
| 3,052,011 | 9/1962 | Brainard | 29—568 |
| 3,191,294 | 6/1965 | Daugherty | 29—568 |
| 3,217,406 | 11/1965 | Dever | 29—568 |
| 3,238,615 | 3/1966 | Leone | 29—568 |
| 3,073,024 | 1/1963 | Hutchens | 29—568 |
| 3,157,283 | 11/1964 | Maass | 29—568 |

RICHARD H. EANES, JR., *Primary Examiner.*